(12) United States Patent
Zia

(10) Patent No.: US 7,897,038 B2
(45) Date of Patent: *Mar. 1, 2011

(54) FILTER MEDIA SURFACE MODIFICATION FOR ENHANCED SEALING AND APPARATUS UTILIZING THE SAME

(75) Inventor: Majid Zia, White Bear Township, MN (US)

(73) Assignee: Hemerus Medical, LLC, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/974,649

(22) Filed: Oct. 15, 2007

(65) Prior Publication Data

US 2008/0093289 A1 Apr. 24, 2008

Related U.S. Application Data

(63) Continuation of application No. 10/306,646, filed on Nov. 27, 2002, now Pat. No. 7,281,632.

(60) Provisional application No. 60/334,256, filed on Nov. 30, 2001.

(51) Int. Cl.
*B01D 35/01* (2006.01)

(52) U.S. Cl. .......... 210/94; 210/436; 210/445; 210/455; 210/472; 210/490; 210/506

(58) Field of Classification Search .............. 210/94, 210/436, 445, 472, 490, 506, 227, 229, 455
See application file for complete search history.

(56) References Cited

U.S. PATENT DOCUMENTS

| | | | | |
|---|---|---|---|---|
| 3,386,585 A | * | 6/1968 | Weyand et al. | 210/445 |
| 3,520,416 A | * | 7/1970 | Keedwell | 210/490 |
| 4,319,996 A | * | 3/1982 | Vincent et al. | 210/188 |
| 6,171,493 B1 | * | 1/2001 | Zia et al. | 210/257.1 |
| 6,209,541 B1 | * | 4/2001 | Wallace | 128/205.27 |
| 7,281,632 B2 | * | 10/2007 | Zia | 210/436 |

* cited by examiner

*Primary Examiner* — Matthew O Savage
(74) *Attorney, Agent, or Firm* — Marshall & Melorn, LLC

(57) ABSTRACT

A novel surface treatment is provided for portions of filter media coming in contact with the filter media holder, such as filter housing. In certain applications, the treatment is also applied to the filter media holder, depending on the application. Filter media having at least two distinct surface property modifications are provided in liquid filtration applications to enhance the performance of a filtration system, reduce the cost of the system, provided a visual means of detecting fluid bypass, and minimize fluid holdup volume within the filter media, all with substantially no loss of performance performances parameters, even in steam sterilization applications.

9 Claims, 8 Drawing Sheets

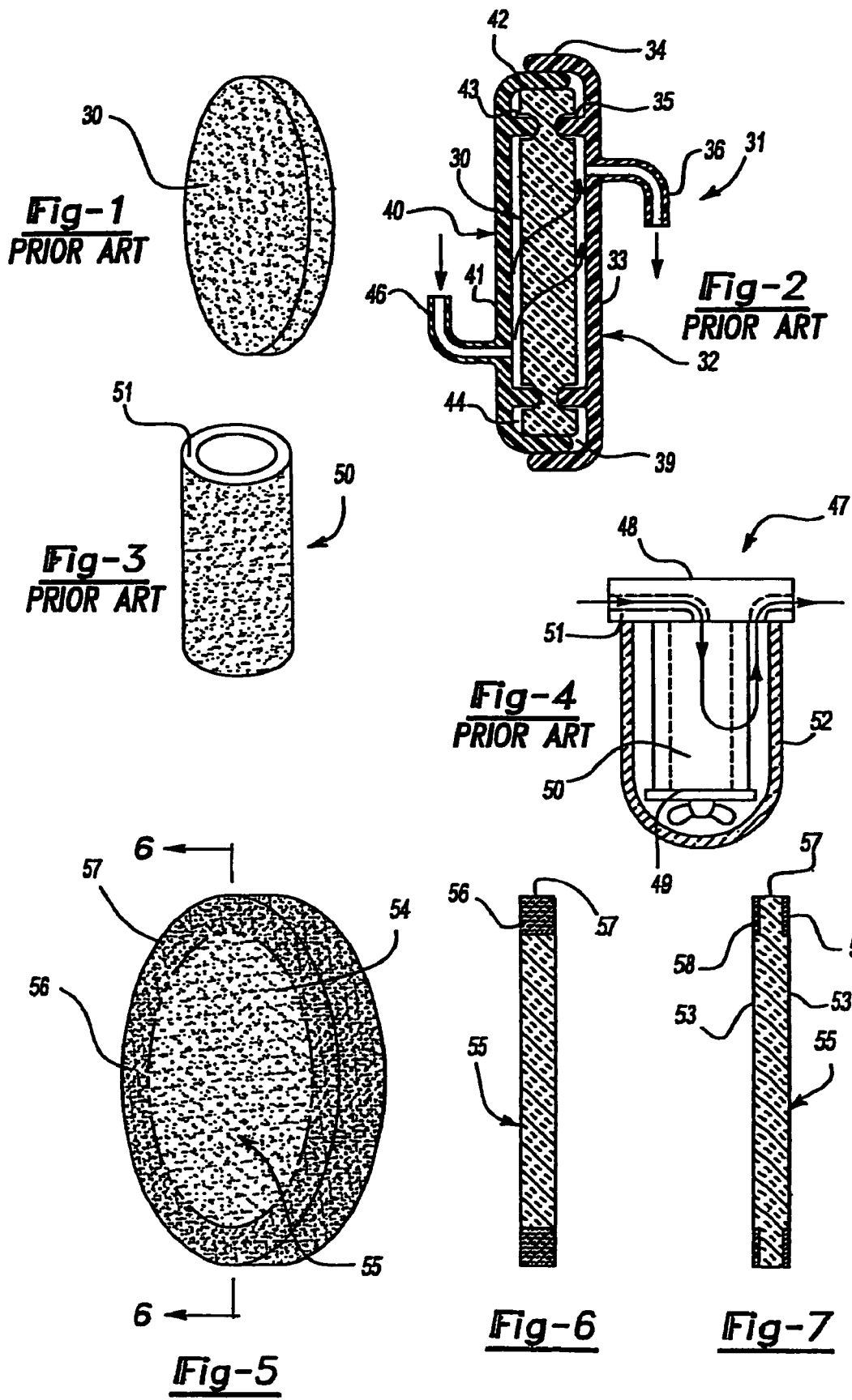

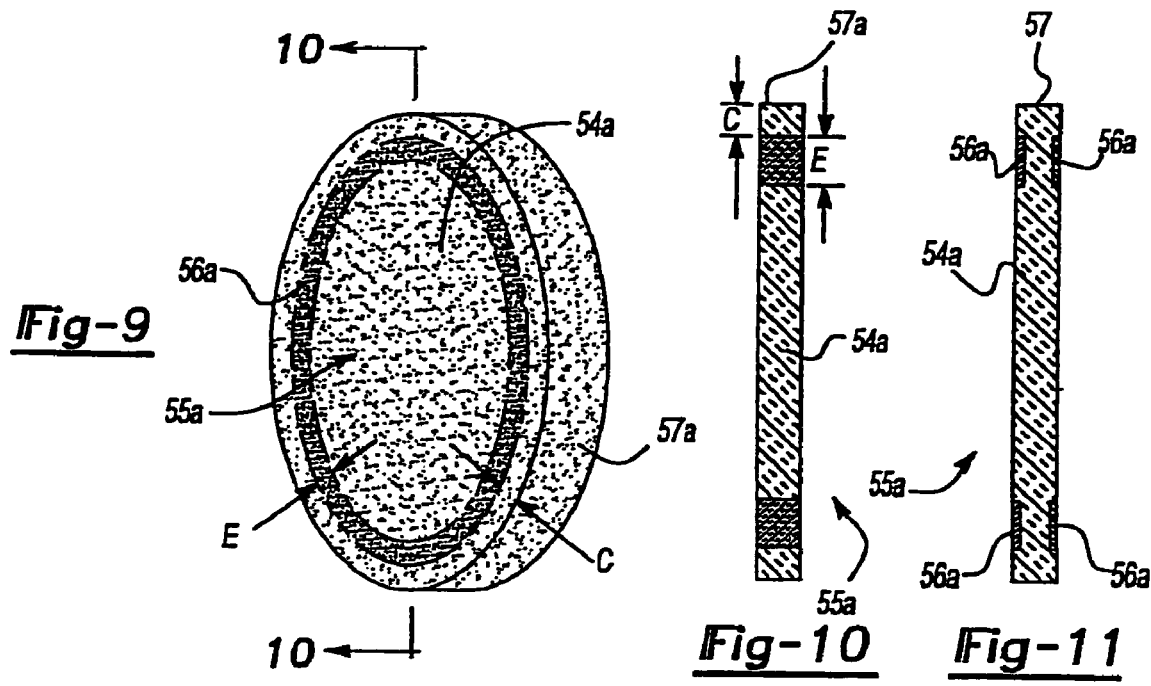
*Fig-9*  *Fig-10*  *Fig-11*
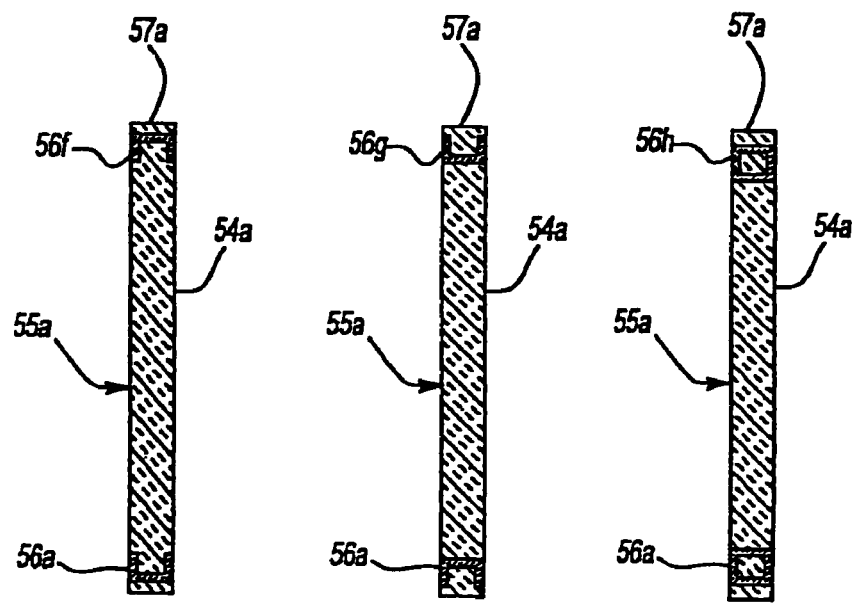
*Fig-11A*  *Fig-11B*  *Fig-11C*

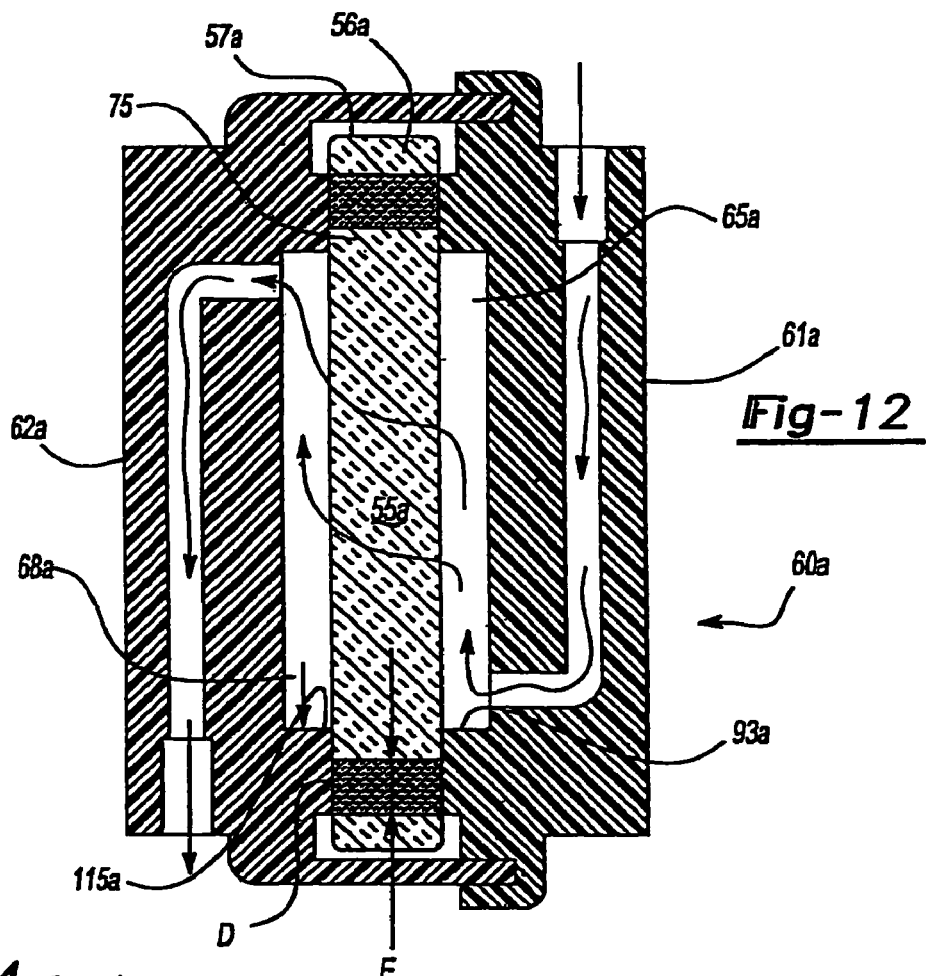
*Fig-12*
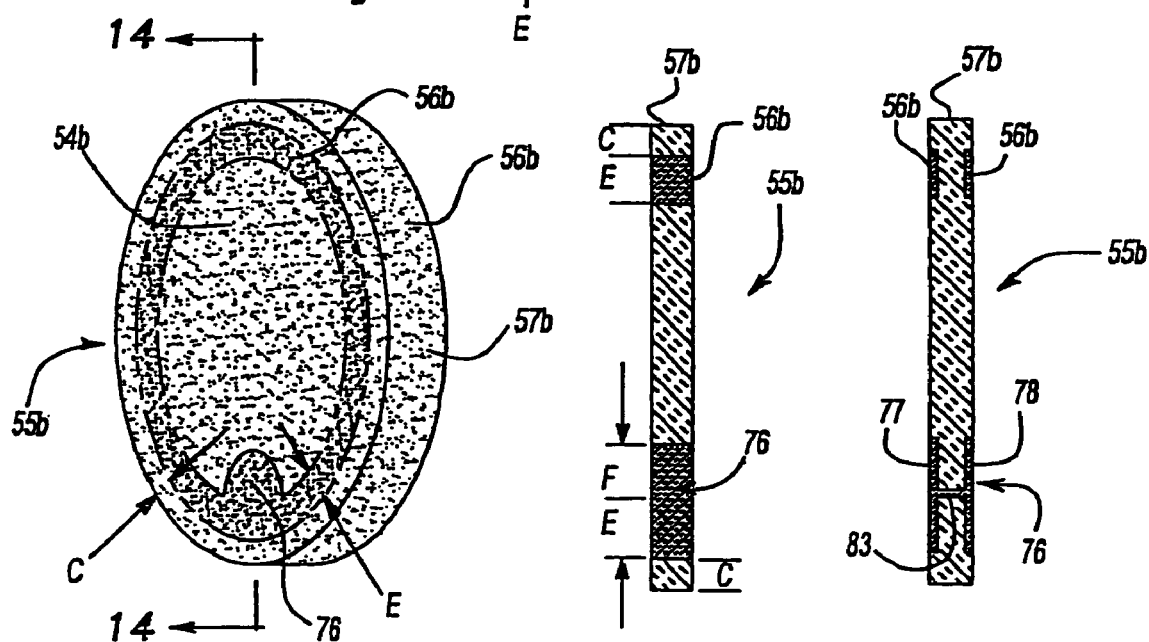
*Fig-13*  *Fig-14*  *Fig-15*

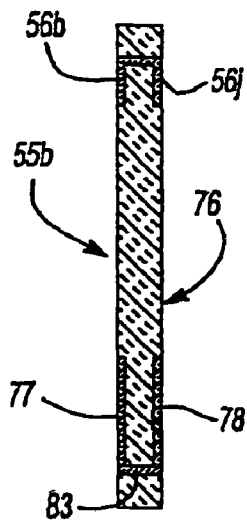
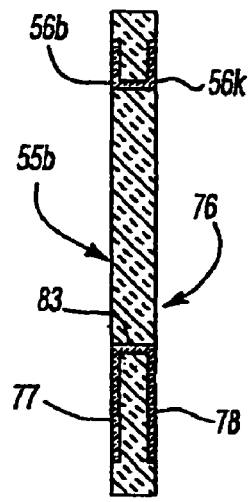
*Fig-15A*  *Fig-15B*
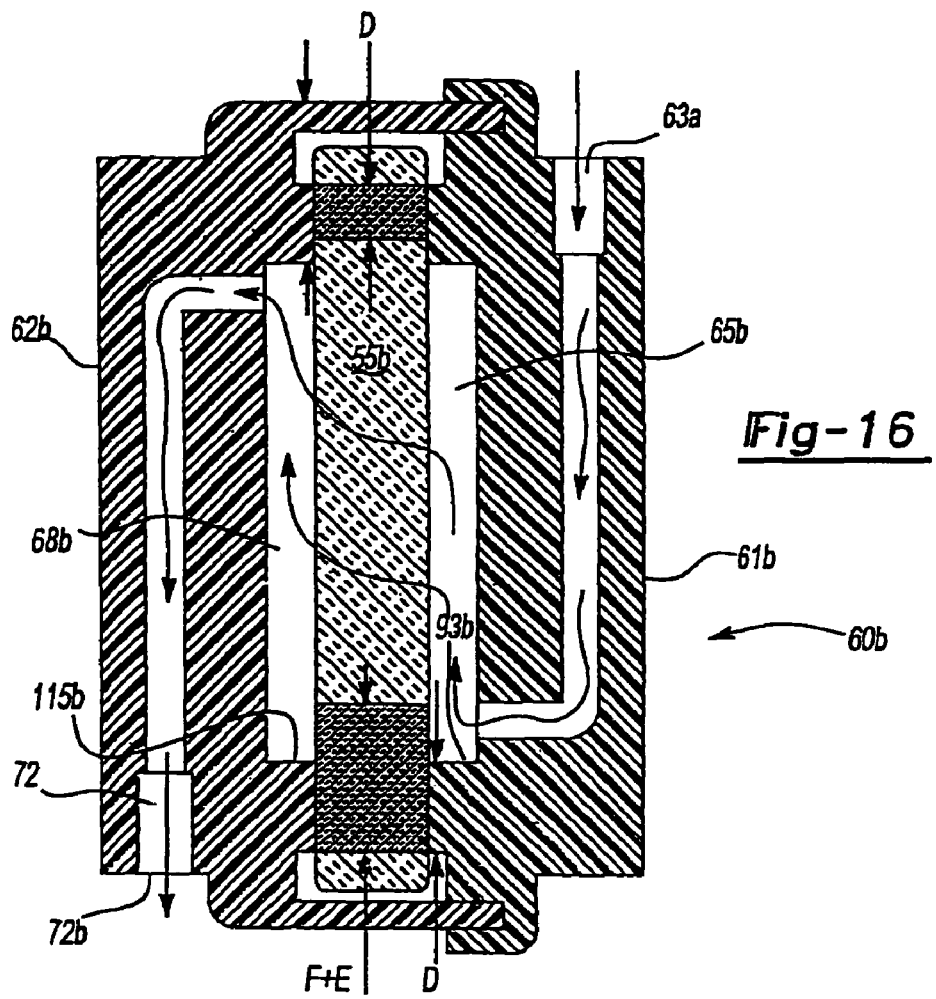
*Fig-16*

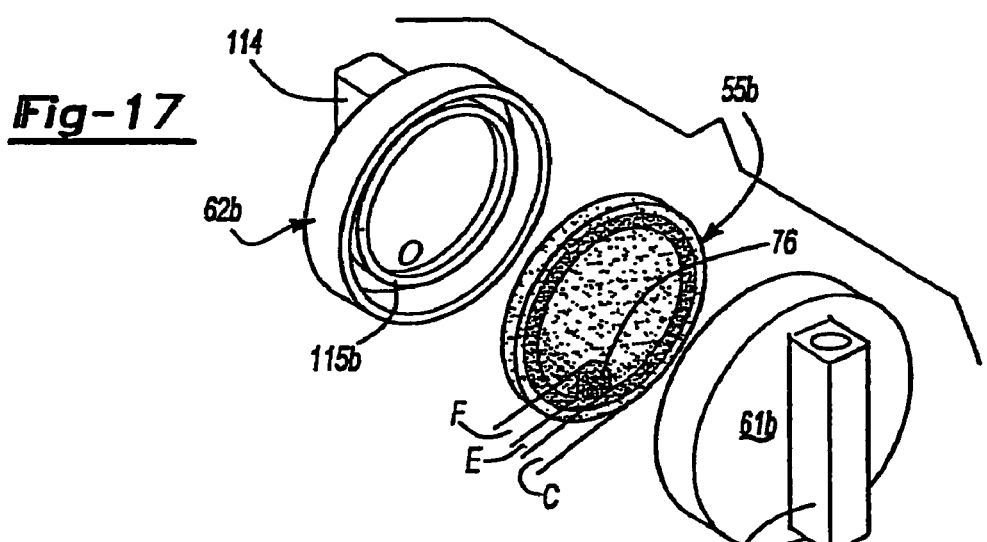
*Fig-17*
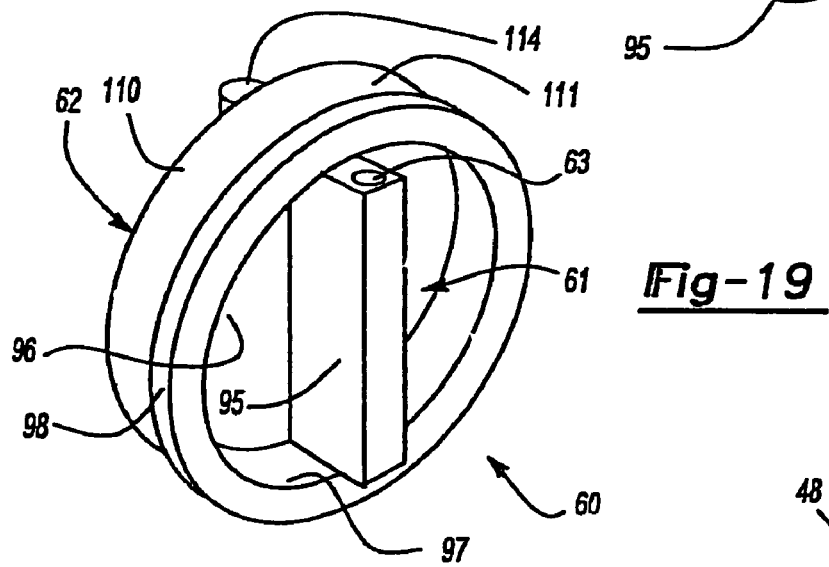
*Fig-19*
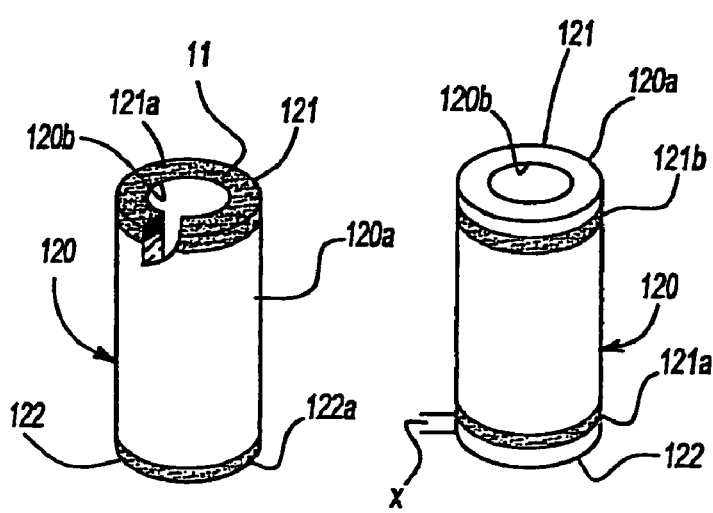
*Fig-18A*  *Fig-18B*
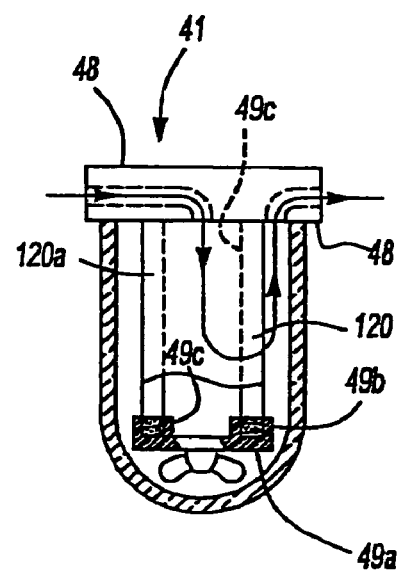
*Fig-18C*

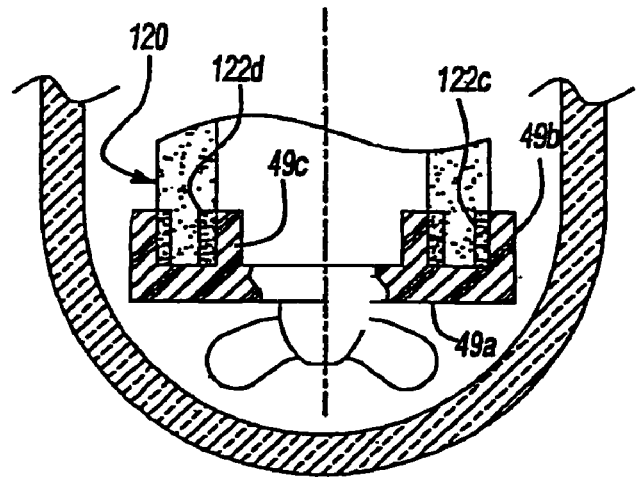
*Fig-18D*
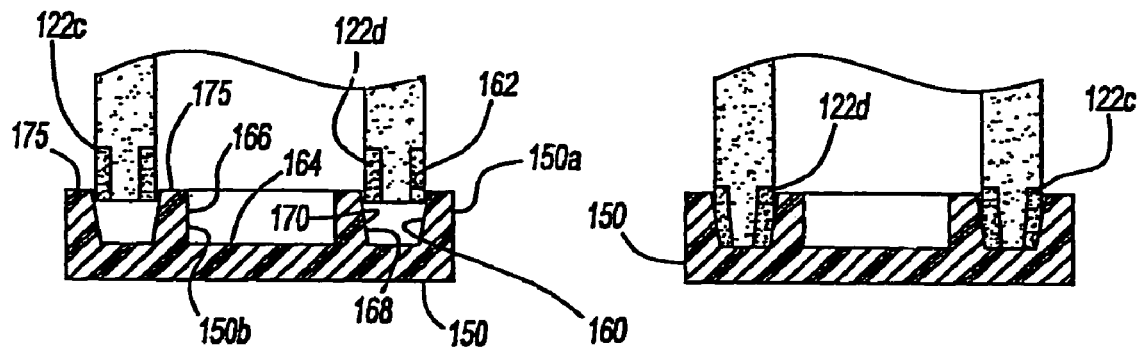
*Fig-18E*  *Fig-18F*
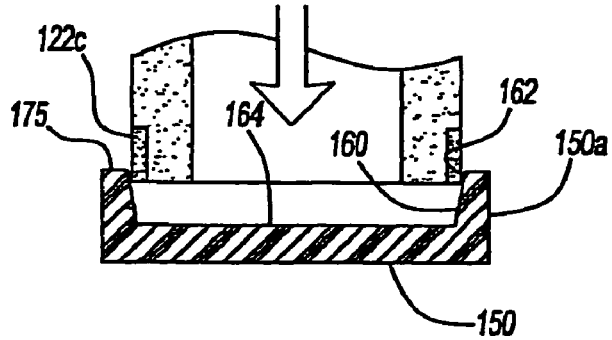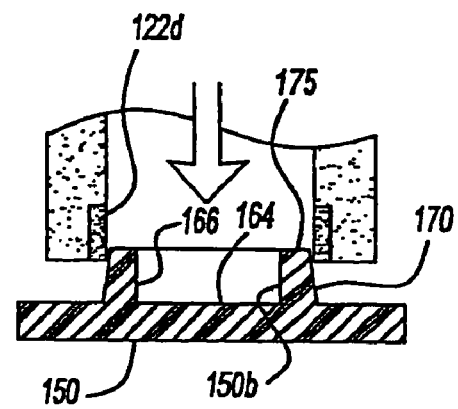
*Fig-18G*  *Fig-18H*

FILTER MEDIA SURFACE MODIFICATION FOR ENHANCED SEALING AND APPARATUS UTILIZING THE SAME

CROSS-REFERENCE TO RELATED APPLICATION

This application is a continuation of U.S. application Ser. No. 10/306,646, filed Nov. 27, 2002, now U.S. Pat. No. 7,281,632. Application Ser. No. 10/306,646 claimed the benefit, under 35 U.S.C. 119(e), of the provisional application filed on Nov. 30, 2001, under 35 U.S.C. 111(b), which was granted Ser. No. 60/334,256. Application Ser. No. 10/306,646, and the provisional application 60/334,256 are hereby incorporated by reference in their entireties.

BACKGROUND OF THE INVENTION

1. Field of the Invention

The present invention relates to a filter media with at least two regions with distinct media properties that result in an enhanced sealing of filter media between individual layers or between the filter media and a sealing means. More specifically, the present invention relates to a surface property modification of filter media and/or a sealing surface to enhance the sealing of the filter media within various filter housings. More particularly, the present invention relates to a surface property modification which repels liquid at the points of contact between the porous filter material and the sealing surfaces of the filter housing. Most particularly, the present invention relates to an improved filter medium that results in an improved sealing of filters and provides means for fluid-gas transfer.

2. Discussion of the Related Art

It is well known in the art that one of the most important aspects of a filter design, especially in critical fluid filter applications such as medical products and semi-conductor applications, is the prevention of filter failure.

In critical applications, even minor amounts of fluid bypass result in a nonconforming fluid for the application at hand. Therefore, providing good sealing between various components of a filter or filtration system is critical.

One of the most common, but not the most reliable, sealing mechanisms to date is a pinch seal. In a typical pinch seal the filter media is squeezed between two sealing surfaces. In a typical seal, special attention must be focused upon the amount of pressure imposed on the filter media to assure proper sealing and to minimize the possibility of fluid bypass. Special attention must be focused upon the structural properties of the media and its capability to handle the stress caused by the pinch seal. Typically, in a pinch seal, a designer would like to provide a maximum pressure at the seal without compromising the stability of the filter structure. The higher the pressure at the sealing surface, the higher the compression of the media at point of contact. Typically, this can result in a reduced pore size in the affected area, and also reduce the gap or pore size between the filter media and the sealing surface. This prevents fluid flow past the pinch seal as long as the pore size is small enough to black flow. Another way to stop flow past the seal is to block the pores proximate the seal with potting compound.

The present invention provides a better seal without the aforementioned problems. This is accomplished by making the seal material non-wetting to the fluid being filtered and, thereby, providing a liquid repellent seal. More specifically, a liquid repellant porous seal with a liquid wetting filter area. The wettability (fluid wetting properties) of the seal may be adjusted by methods known in the art. The present invention provides a differential wettability at the sealing surface.

The present invention teaches that the wettability of the seal may be decreased to prevent fluid bypass past the seal. At the same time, the main filter area is desired to be fluid wettable, especially for fluid filter applications, to provide fast priming times. In gravity feed systems or low pressure applications, the wettability of the filter medium is important as there is a minimum breakthrough pressure required to start fluid flow through a filter. The breakthrough pressure decreases with increased wettability. Therefore, the present invention provides a differential wettability of the filter media at the sealing surface. Also, it is noted that the surface property of the sealing surfaces, such as the housing, may be changed to enhance the seal.

In general, the wettability of a porous material depends on a number of parameters, including pore size and surface properties of the material involved. In addition, there will be a number of other advantages to the present invention that will be apparent from the descriptions provided and the applications shown.

Present day filter media, whether in the form of flat sheets of various shapes, such as circles, ovals, or other desired shapes, or in tubular form, are generally homogeneous throughout, and consist entirely of filter media without any treatment to the sealing regions to enhance sealing. This produces problems in the prior art.

With filter media sheets, there tends to be leakage past the commonly used pinch seal, unless this seal is carefully designed. Such attention to the seal increases the cost of the filter housing holding the media, may result in additional components, and an increase in final product weight, to effect a proper seal. Sometimes, adhesives or other agents are needed to effect any seal at all. Also, since the pinch seal is typically wetted by the fluid, there is no possibility of a visual aide in discerning if the seal is adequate and the fluid being filtered is not bypassing the seal. A visual aide in detecting fluid bypass may provide an opportunity to save the fluid such that it may be processed in a single pass.

The same problems occur with tubular filters when attempting to provide effective seals at or near the ends of the filter tubes. The prior art is replete with special types of end caps and housing modifications designed to effectuate the seal between the tubular filter media, which is usually made of randomly oriented fibers (particles), and an end cap and/or housing. Again, these measures increase costs for the filter products. Thus, those skilled in the filter art continued to search for a better method of sealing filter media within filter housings.

In critical applications adhesive may be used to increase the reliability of the filter seal by typically filing the gaps or pores between the sealing surface and the media. The adhesive may be surface loaded in the area of the seal, or the adhesive may be present throughout the depth of the filter media for added protection against fluid bypass.

The addition of adhesive, typically provides a barrier to fluid bypass past the sealing surface. But in addition, it may provide added complications in certain applications. These include separation of various components of the adhesive, which may result in physical property changes in the seal such as bio-compatibility, thermal stability and chemical compatibility, decreased process time as the adhesive is typically thickened to control wicking of the adhesive into the filter media, and reduced versatility of the adhesive and/or the media as each application needs to be considered on a case by case basis to ensure a proper seal. Also, it is important for the adhesive to bond properly to the housing to provide an adequate seal. Delamination of the adhesive between the various components may result in fluid bypass.

If the adhesive is a multi-component, the various components of the adhesive may separate due to the capillary forces present in the filter media and may compromise the properties of the adhesive and the seal. Also, in certain instances this may result in bio-compatibility and/or leachability issues.

In addition, adhesives may have different physical properties than the filter media and the housing. Certain environmental conditions may result in a compromise of the seal. An example of such instance may be when the thermal expansion property of adhesives may not match that of the housing. Therefore, certain thermal fluctuations (such as those seen in typical medical applications requiring autoclaving) may result in a compromising of the seal. This is especially important in medical applications requiring autoclaved parts or heat or steam sterilization.

The present invention provides novel solutions and enhancements to these problems in the prior art. The present invention will describe a hydrophobic (hydrophobic in the context of this application is synonymous with liquid repellent) barrier that may be used in conjunction with the use of adhesives. The hydrophobic barrier will provide a restriction to the wicking of adhesive past a desired point. In addition, it provides a general means of treating media that may be used with various adhesives. Currently, the properties of the filter media and the adhesive are chosen such as to control the wicking of the adhesive. The present invention provides a novel concept, a barrier, such that these factors are not as important. The media may be used with a various adhesives, and one adhesive may be used with a variety of media. The barrier also provides a clear and distinct area where the adhesive will be present. Advantages include reduced variation in filter properties, such as flow rate, efficiency and capacity, as the usable filter area is clearly defined by the barrier.

The present invention also provides novel means to provide an enhanced sealing mechanism for filtration and separation applications. One novel concept provides a porous seal with enhanced seals to decrease possibility of bypass. The novel concept minimizes fluid hold-up volume within a filter and enables greater fluid recovery. It also decreases cost of the filtration system by the possibility of eliminating components such as adhesive, and also reduces the weight of the filter by providing a porous structure seal through elimination or minimization of adhesive usage. In special configurations to be described, the present invention provides an integral venting means within the filter that is an integral part of the sealing means.

Further, the present invention describes a novel concept that provides enhanced sealing of filter by providing a barrier to fluids. The barrier provides a means to prevent fluid contact across a pinch seal. In it's simplest form the barrier provides a definite and clear barrier against fluid wicking or fluid migration. One of the advantages of this novel concept is that it prevents separation of multi-component adhesives. In addition, it broadens the selection criteria for filter media and/or adhesive. This is due to the fact that the barrier provides a broader range of adhesives that may be used with a given filter media structure. The influence of adhesive properties such as surface tension, viscosity, and gel time are minimized and, as such, provides a greater flexibility in the production of various filters. Also, the barrier enables combining a number of filters into a single filter housing. The single housing concept reduces the number of components and provides overall cost savings.

Providing multiple filters in a single housing with integral non-wetting barrier enables a number of novel concepts for filtration and separation systems. Fluids may be processed side by side. The barrier may be penetrated at elevated pressures providing unique separation and mixing applications. For example, the filter may be subjected to sufficient positive and negative pressure to drive fluid across the barrier. The pressure may be applied by various means known in the art such as centrifugation, infusion pumps, syringe, etc. A number of applications will be described in this application to demonstrate the novelty of this concept.

Other advantages of the present invention will be apparent from the description hereby provided.

SUMMARY OF THE INVENTION

The problems in the art are solved by the present invention by providing a novel surface treatment for portions of the filter media coming in contact with the filter media holder, such as a filter housing.

There are various methods known in the art for producing surface (material) property modifications. These include chemical, mechanical, plasma, corona and heat (flame) treatment. Preferred chemical treatments for hydrophobic applications are fluorinated, silicon zed, fluorosilicon, polyolefin polymers which result in reducing the critical wetting surface tension of the material.

In general, most polymers have a low surface tension and may be used as coatings to modify the CWST of a material. Due to their low surface tension they are typically used to provide a liquid repellant region. Preferred chemical treatments for hydrophilic applications include polymers with a hydroxyl functional group such as Poly-vinyl Alcohol and cellulose, and a functionalized cellulose group such as cellulose acetate and ethyl cellulose, carboxylic acid functional group, amine functional group, sulfonic acid functional group. It should be noted that chemical treatments in varying quantity may be applied to various regions to provide distinct wetting properties. For example, the pinch seal region may be made more hydrophobic than the filtering region by applying a larger quantity of the hydrophobic binder to the pinch region. In general the regions may have varying compositions to provide for the desired functions pointed out in the invention.

In certain applications, an internal vent is provided by means of a novel surface treatment to provide for faster priming of the filter without entrapping gas upstream of the filter media, which may adversely effect the filtration process (increase filtration time, decrease efficiency).

The present invention provides for a porous media with at least two distinct surface property modifications in liquid filtration applications to enhance the performance of the filtration system, reduce the cost of the system, and provide a visual means of detecting possible fluid bypass.

The present invention is related to, but not limited to, filter media, fluid processing, gas venting, gas transfer, and fluid transfer. A means of providing a preferential fluid flow within a filter by liquiphobic (liquid repellant) or liquiphilic (liquid wetting) treatment of a porous medium is disclosed.

The present invention is most suited for, and related to, pinch seals where a porous media is sealed within a housing by pinching or flat gasket sealing of media within the housing. This method is commonly used in price/cost sensitive applications. One of the drawbacks of pinch sealing has been the possibility of fluid bypass.

One of the possibilities of bypass is due to preferential permeability or wettability of the media in the cross-flow direction. This situation is especially important with thick filter media over sealing surface length seals. The present invention reduces the risk of such bypass.

These benefits are achieved through the aforementioned surface property modification of the filter media, which is based on the relationship between the critical wetting surface tension (CWST) of the filter media being used, and the surface tension of the fluid being filtered.

For the purposes of the present application, the definition of the CWST of the media is not the one generally known in the art from U.S. Pat. No. 4,880,548 ('548), the specification of which is incorporated herein by reference. The ('548) patent defines a media to be wetting if it absorbs at least 9 out of the 10 test drops after 10 to 11 minutes at atmospheric pressure. Instead, it is a use based CWST.

In the present application the CWST of the filter media will be determined based on the particular application or intended use. As in the ('548) patent, a CWST for a series of materials can be determined, but they will all relate to a particular use or application, and may, or may not be relevant to any other use or application.

For example, if a quick priming filter element is desired, one which would not entrap gas in the upstream chamber for two minutes while the upstream chamber fills, and the filter inlet pressure is 40" of fluid column, a satisfactory filter media would be one in which at least a portion of the filter media remains unwetted and capable of venting entrapped gas until the upstream chamber is filled. This requires testing of the filter media with a series of standard liquids with varying surface tensions in a sequential manner under test conditions which simulate actual desired operating conditions. This may be done by placing a number of drops (for example 10) or columns of test fluid (if under differential pressure) on representative portions of porous media, and allowing these to stand for a desired time (in this example two minutes). Observation is made after a desired time (two minutes). Wetting is defined as absorption or wetting of the porous media by at least nine of the ten drops or a reduction in the volume of nine out of ten columns by the equivalent of one drop per column within the desired time. Non-wetting is defined as the retention of a negative angle of contact (for drops), or a substantial retention of volume (for columns). For drops, nine out of ten drops must retain a negative angle of contact. For columns there should be substantially no loss of volume due to absorption by the media (less than one drop).

Testing is continued using liquids of successively higher or lower surface tension, until a pair has been identified, one wetting and one non-wetting, which are the most closely spaced in surface tension. The CWST according to the present application is then in that range. For convenience, the average of the two surface tensions is used as a single number to identify the CWST for the particular application.

Furthermore, the media in the above example does not need to be non-wetting for any more than the two minutes the fluid takes to fill the chamber and the gas to vent (perform its intended function). The media may be wetting after the time it takes to perform its intended function.

Any further references to CWST in the present application refer to the CWST as defined above.

From this definition, and knowledge in the art, it can be seen that if the surface tension (ST) of the fluid is less than the CWST of the filter media, then the fluid will wet the filter media, and the fluid being filtered will flow through the media. The greater the difference between the ST and the CWST, the faster the wetting or priming of the filter media, and the faster the fluid will begin to flow through the filter. Conversely, the closer the ST of the fluid being filtered is to the CWST of the filter media, the longer the priming time of the filter media. If the ST of the fluid being filtered is greater than the CWST of the filter media, the fluid being filtered will simply bead up on the filter media, and no flow will take place.

Using the above relationship between the ST of the fluid being filtered, and the CWST of the media being used, a surface property modification may be performed on the filter media by treatments known in the art such that liquids are repelled at the points of contact between the porous material and the sealing surfaces. For example, if the filter media is liquid wetting (ST of fluid<CWST of media) a portion of the filter media, most preferably the portion which will be in contact with the sealing surface, is treated such that it becomes liquid repellent (ST of fluid>CWST of media). It is also advantageous if the entire, or at least a portion of, the sealing surface of the housing which will be in contact with the treated porous media would also be liquid repellent. This may occur because of the material of which the housing is made, or by treating the surface(s) of the housing which are to contact the filter media.

The invention is not limited to surface treatment modification as the filter media may be a composite with appropriate wetting characteristics provided by methods well known in the art.

The liquid repellent porous media will result in a higher than normal liquid breakthrough pressure compared to a non-treated media of the same structure. Also if the porous media is liquid repellent throughout its depth, the fluid will not advance into the sealed portion, thereby reducing possible liquid holdup within the liquid repellent section of the porous media.

The present invention is well suited for low pressure applications, such as gravity feed systems. An important feature of the present invention is the creation of a fluid barrier that prevents liquid breakthrough past the sealing surface. Due to the low fluid pressure of such systems, this may be accomplished by surface modification of the porous material or media. For a liquid wetting filter media, the CWST of the media at the seal is reduced, so that the CWST of the media is less than the ST of the fluid being filtered, and therefore, the media will be liquid repellant at the seal.

For a liquid repellent material, the surface tension of the material at the seal may be increased further, to provide enhanced sealing.

Likewise, the central portions of the filter media may be treated to increase or decrease how fast wetting of the media takes place, i.e., how fast priming occurs. If a liquid wetting filter media is being used, the central portion may be treated to increase the CWST thereof, and make the media more liquid wetting than otherwise. This may be advantageous where it is desired to use a less costly media which is not particularly fast priming, but treatment in the above manner can make it prime as fast as a more costly material. Conversely, one media may be desirable for a particular application, but primes too fast. Treatment in the above manner can slow the priming time. Other advantageous applications are well within the scope of the present invention.

In one embodiment of the present invention, a flat porous a filter media made of a liquid wetting material is treated about the edge regions thereof so that the CWST of the material at the seal is reduced to a value less than the surface tension of the fluid being filtered, so that the material at the sealing surface is, in effect, liquid repellant.

In another embodiment of the present invention, a flat porous filter media made of a fluid repellent material is treated about its interior regions such that the CWST of the material at the interior regions is increased.

In a further embodiment of the present invention, a tubular filter made of a liquid wetting material or media is treated at its' sealing surfaces such that the CWST of the material at the sealing surfaces is reduced to a value less than the ST of the fluid being filtered, and thus, is liquid repellant at the sealing surfaces.

In yet another embodiment of the present invention, a filter media in a tubular configuration is made of a fluid repellent material and treated at its' interior such that it is liquid wetting in the interior regions.

In a still further embodiment of the present invention, a filter media holder is provided for use with the improved filter media of the present invention such that a visual indication of fluid bypass of the filter media is easily provided.

In another modification of the present invention, a flat porous filter media (single or multi-layer composition) made of a liquid wetting material has an annular portion near the edge of the filter material treated to reduce the CWST of the material at the sealing region of the filter sufficiently such that the media is liquid repellant.

In a still further embodiment of the present invention, a flat porous filter media of a predetermined shape, and made of a fluid repellent material, has an annular portion proximate the sealing region of the filter material treated such that the CWST of the material is decreased in the annular region.

Thus, it an object of the present invention to provide a surface treatment modification for a filter media which will enhance the sealing of the filter media within a filter holder or housing or between filter media layers.

Another object of the present invention is to provide enhanced sealing between a porous media and a filter housing without the use of adhesives.

Another object of the present invention is to provide a filter media which has been surface treated and mounted in a filter housing to provide an effective seal with a reduced number of components.

A still further object of the present invention is to provide an improved surface treated filter media which achieves an effective seal, and is lighter in weight for the same application, than the known filter media.

Another object of the present invention is to provide an improved filter housing for use with the surface treated filter media which provides a visible means of detecting fluid bypass, thus providing a visual means of detecting filter or housing failure.

Another object of the present invention is to provide a novel filter housing which, when used in combination with the surface treated filter media of the present invention, increases fluid recovery.

Another object of the present invention is to provide a filter media that has at least two distinct surface properties proximate to the sealing surface.

Another object of the present invention is to provide a filter media that provides a barrier to fluid migration past a sealing surface.

Another object of the present invention is to provide an improved adhesive bounded seal with a precise adhesive/non-adhesive boundary.

Another objective of the present invention is to provide a filter media (single or multi-layer) that prevents separation of multi-component fluid mixtures.

Another object of the present invention is to provide a filter media (single or multi-layer) that prevents the separation of multi-component adhesive at the sealing surface.

Another objective of the present invention is providing a non-wetting region proximate to the sealing surface which may be breached under elevated differential pressure across the seal.

Another object of the present invention is to provide a consolidated filter element with porous separating barriers that do not have a liquid communication means.

Another object of the present invention is to provide a liquid barrier across a sealing means.

Another object of the present invention is to decrease liquid hold-up volume within a sealing region.

Another object of the present invention is to provide an integral venting means integral within the filter media.

Another object of the present invention is to provide a venting means integral with an enhanced sealing means.

Another object of the present invention is to provide a filter with multiple separated compartments.

Another object of the present invention is to provide a platform for mixing, transporting, separating fluid(s) across a liquid repellent porous partition.

Further objects and advantages of the present invention will be apparent from the following description and appended claims, reference being made to the accompanying drawings forming a part of the specification wherein like reference characters designate corresponding parts in the several views. It should be noted that although two-dimensional filter media configurations are discussed within this application, other filter media configurations, such as corrugations, domed, tubular or, in general, three-dimensional configurations, are within the scope of this invention.

BRIEF DESCRIPTION OF THE DRAWINGS

FIG. 1 is a perspective view of a known filter media of circular shape.

FIG. 2 is a diagrammatic sectional view, showing a representative filter holder holding the filter media of FIG. 1.

FIG. 3 is a perspective view of a known filter media in tubular form.

FIG. 4 is a diagrammatic representation of one common way of sealing the filter media shown in FIG. 3 in a filter housing.

FIG. 5 is a perspective view, of a construction embodying the present invention.

FIG. 6 is a sectional view, taken in the direction of the arrows, along the section line 6-6 of FIG. 5.

FIG. 7 is a sectional view, in large part similar to FIG. 6, but showing a modification of the present invention.

FIG. 9 is a perspective view showing a filter media construction embodying a further modification of the present invention.

FIG. 10 is a sectional view, taken in the direction of the arrows, along the section line 10-10 of FIG. 9.

FIG. 11 is a sectional view, in large part similar to FIG. 10, showing a further modification of the present invention.

FIG. 11A is a sectional, elevational, view showing a modification of the construction shown in FIG. 11.

FIG. 11B is a sectional, elevational, view showing a further modification of the construction shown in FIG. 11.

FIG. 11C is a sectional, elevational, view showing a further modification of the construction shown in FIG. 11.

FIG. 12 is a diagrammatic sectional view, showing the construction of FIG. 9 mounted in a novel filter housing.

FIG. 13 is a perspective view of a further modification of the present invention wherein a vent is added to the construction of FIG. 9.

FIG. 14 is a sectional view, taken in the direction of the arrows, along the section line 14-14 of FIG. 13.

FIG. 15 is a sectional view, in large part similar to FIG. 14, showing a further modification of the present invention.

FIG. 15A is a sectional, elevational, view showing a modification of the construction shown in FIG. 15.

FIG. 15B is a sectional, elevational, view showing a further modification of the construction shown in FIG. 15.

FIG. 16 is a diagrammatic sectional view, showing the construction of FIG. 13 mounted within a novel filter housing.

FIG. 17 is an exploded perspective view of the construction shown in FIG. 16.

FIG. 18A is a perspective view, partly fragmented, showing a further modification of the present invention.

FIG. 18B is a perspective view, showing a further modification of the present invention.

FIG. 18C is a diagrammatic view of an improved filter housing embodying the present invention which can utilize the constructions shown in FIGS. 18A and 18B.

FIG. 18D is a modification of the construction shown in FIG. C.

FIG. 18E is a view similar in part to FIG. 18D, but showing tapered walls on the end cap illustrated which are designed to slightly "crush" the end of the filter tube when it is sealed in the filter housing of FIG. 18C.

FIG. 18F is a view similar to FIG. 18E, but showing the filter tube of FIG. 18E fully installed in the end cap, with the end of the filter tube slightly "crushed".

FIG. 18G is a view similar in part to FIG. 18e, but showing the surface treatment only at the outer peripheral wall of the filter tube, and showing only a tapered, outer peripheral wall on the end cap.

FIG. 18H is a view similar in part to FIG. 18E, but showing the surface treatment only at the inner peripheral wall of the filter tube, and showing only a tapered, inner peripheral wall on the end cap.

FIG. 19 is a perspective view of a fluid filter construction embodying the present invention.

DESCRIPTION OF THE PREFERRED EMBODIMENTS

Figures 7A, 7B, 7C:
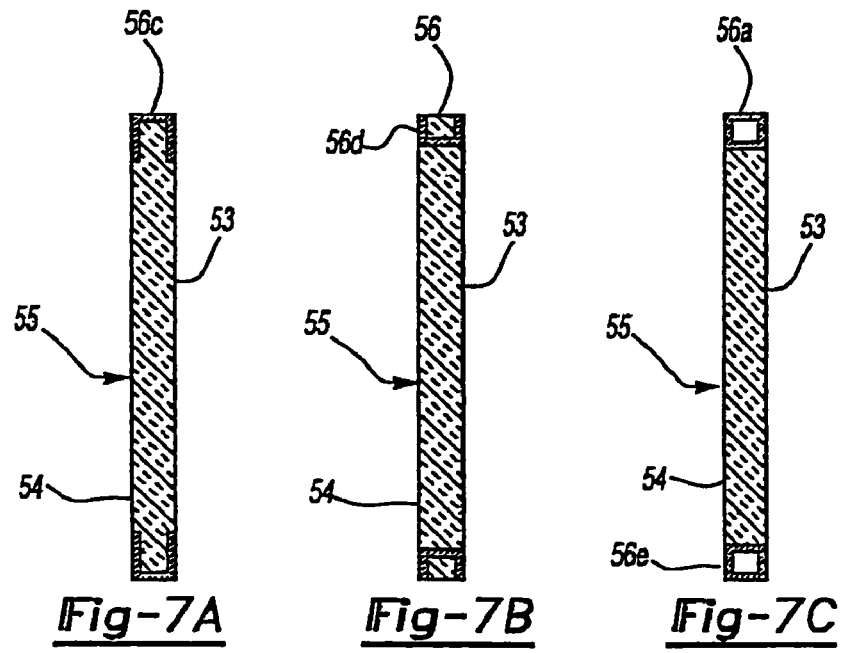
FIG. 7A is a sectional, elevational, view showing a modification of the construction shown in FIG. 7.
FIG. 7B is a sectional, elevational, view showing a further modification of the construction shown in FIG. 7.
FIG. 7C is a sectional, elevational, view showing a further modification of the construction shown in FIG. 7.

Referring to FIGS. 1-2, a typical filter media 30 in a flat sheet form is shown. While the media is shown in a circular shape, the media may be in an oval, square, diamond or other desired shape. The filter media 30 may be made of more than one layer, if desired.

A section taken through the filter media 30, such as shown in FIG. 2, reveals no distinct surface property variation proximal to the sealing surface. Thus, nothing is found in the prior art filter media 30 itself to aid in sealing it in a typical filter housing 31, such as is illustrated in FIG. 2.

The typical filter housing 31 will normally be of a shape complimentary to the filter media 30, and designed to pinch seal the filter media 30 between two halves of the filter housing. The filter housing 31 has a first half or portion 32 having a first circular side wall 33, a first upstanding peripheral wall 34 at the periphery thereof, and a second, inwardly spaced, peripheral upstanding wall 35 spaced inwardly a predetermined desired distance from the upstanding outer peripheral wall 34. A first annular space 39 is formed between the sidewalls (34,35). An outlet 36 is formed on the circular sidewall 33 for purposes to be described.

A mating second half or portion 40 has a second circular sidewall 41, a second upstanding peripheral wall 42, and a second, inwardly spaced, upstanding peripheral wall 43. The second upstanding peripheral wall 43 is evenly spaced a predetermined distance from the second upstanding peripheral wall 42 to provide a second annular space 44.

The dimensions of the first filter portion 32 and the second filter portion 40 are chosen such that the inside diameter of the first upstanding peripheral wall 34 is related in a predetermined, desired, manner to the outside diameter of the second upstanding peripheral wall 42. Depending on how it is desired to fasten the first portion 32 and the second filter portion 40, these dimensions may be chosen to provide a loose fit, an adjacent fit, or an interference fit between the first half 32 and the second half 40 of the filter housing 31.

To assemble the filter housing, the filter media 30 will be placed in the filter housing 31. The filter media 30 preferably has a diameter substantially equal to the inside diameter of the second upstanding peripheral wall 42. The filter media may be laid in the second filter portion 40 and, because the second inwardly spaced upstanding peripheral wall 43 is of a height less than the second upstanding peripheral wall 42, the filter will lay on top of the second inwardly spaced peripheral wall 43.

The first or cover portion 32 of the filter housing 31 is then placed over the second filter portion 40. Since the diameters of the first inwardly spaced peripheral upstanding wall 35 of the first filter portion 32, and the second inwardly spaced peripheral wall portion 43 of the second filter portion 40, have been chosen so that when the two halves of the filter 31 are assembled they are substantially directly opposite each other, and the height of the two walls have been carefully chosen, the filter media 30 will be "pinched" between the first inwardly spaced peripheral upstanding wall 35 and the second inwardly spaced upstanding peripheral wall 43 The first portion 32 and the second portion 40 of the filter housing 31 may then be bonded, sonic welded, adhesively or otherwise joined to each other. Fluid will come in the inlet 46, go through filter media 30, and exit out the outlet 36.

In some cases, to increase the reliability of the pinch seal, and reduce filter failure, adhesive is introduced to the first annular space 39 and the second annular space 44 when the filter housing 31 is assembled. However, because of lack of surface treatment modification of the filter media 30, all of the aforementioned problems present in sealing flat sheet filter media may occur in one form or another in all the known prior art filter housings.

Referring to FIGS. 3 and 4, a typical prior art tubular filter 50 is shown. The end 51 of the filter 50 shows no surface treatment modification, and typically none is found at either end of the tube 50. Therefore, the sealing problems discussed above in regard to flat filter media 30 are also present with tubular filters 50.

As shown in FIG. 4, tubular filter 50 is generally sealed in a filter housing 47 between the filter head 48 and an end cap 49. Filter bowl 52 seals the filter tube 50 within the filter housing 47.

Referring now FIGS. 5-8, there is shown a flat porous filter media 55 embodying the construction of the present invention. The flat porous media is shown in a circular shape, but may be of an oval, diamond, square or any other practical shape, and may be made of any media material. An annular shaped portion 56, proximate the edge 57 of the filter media 55, has been treated such that the CWST of the media is less that the ST of the fluid being filtered, and therefore, the annular portion 56 of the filter media 55 is liquid repellant with respect to the fluid being filtered. The interior 54 of the flat sheet 55 is less liquid repellent and the annular shaped portion or perimeter 56 of the filter media 55 is more liquid repellent.

As shown in FIG. 6, it is preferred that the liquid repellent portion 56 extends entirely through the filter media 55. However, in some applications, such as shown in FIGS. 7 and 13, it may be desired that some surfaces of each side of the flat porous media 55 be treated with liquid repellent to produce a first annular liquid repellent portion 58 and a second annular liquid repellent portion 59. While this version may be useful in some applications, it is not the most preferred embodiment, because the fluid being filtered may wick to the edge 57, or beyond, resulting in possible fluid loss. However, it may be useful if fluid flow past the seal is desired without bypass at the sealing surface.

Modifications which prevent wicking to the edge are shown in FIGS. 7A-7C. In FIG. 7A the filter media 55 has the annular or ring shaped treated portion 56 in the form of an inwardly radially extending U-shaped channel 56C. In FIG. 7B, it is shown as an outwardly radially extending U-shaped channel 56D. In FIG. 7C, the annular or ring shaped treated portion 56 is in the form of a box channel 56E.

Figure 8:
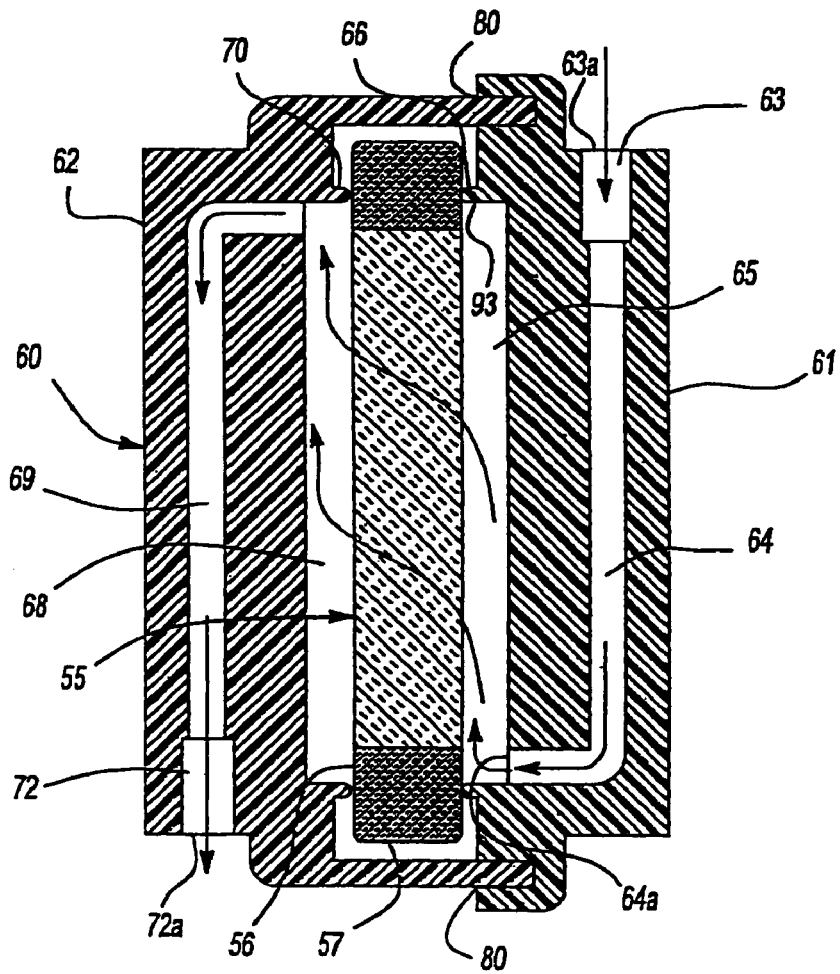
FIG. 8 is a diagrammatic sectional view, showing the construction of FIG. 5 mounted in a novel filter housing.

With reference to FIG. 8, there is shown a diagrammatic view of a novel combination of a filter housing 60, and the flat sheet media 55, which together increase efficiency, reduce hold-up volume, and achieve the aforementioned advantages. The filter media 55 is shown in a pinch seal arrangement between two halves (61, 62) of the filter housing 60. The filter 60 consists of an inlet section 61 and an outlet section 62. The inlet section 61 of filter 60 has an inlet 63 including port 63A communicating with a first passage 64, which is in fluid communication with a first or inlet chamber 65 through first port or outlet 64A.

Figure 20:
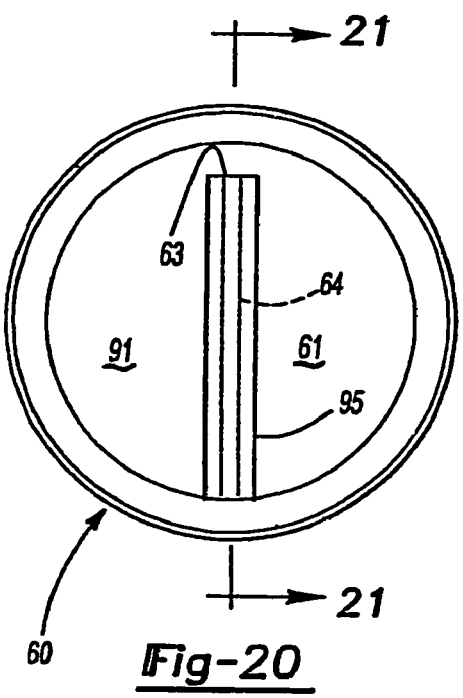
FIG. 20 is a front elevational view of the construction shown in FIG. 19.
Figure 21:
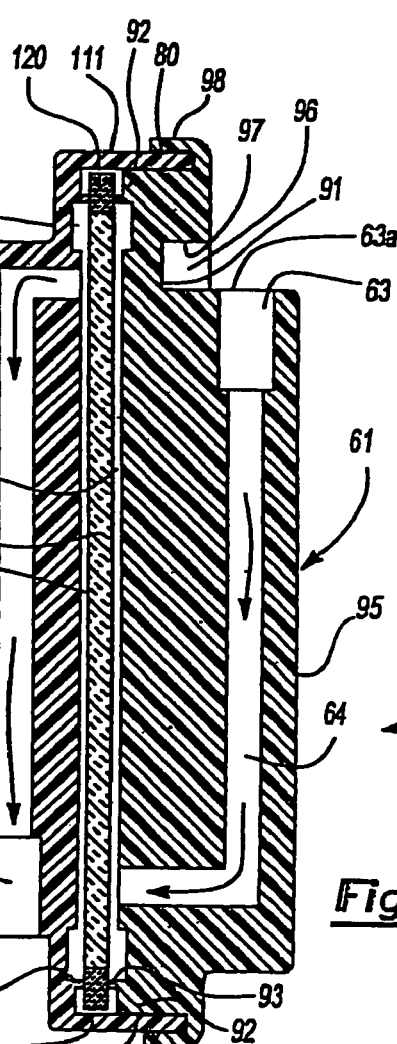
FIG. 21 is a sectional view, taken in the direction of the arrows, along the section line 21-21 of FIG. 20.

A more detailed embodiment of a construction embodying the present invention is shown in FIGS. 19-21.

The filter 60, as aforementioned, includes an inlet section 61 which is bonded to an outlet section 62 by a seal 80. The seal 80 is preferably an ultrasonic seal, and may be full, or partial. It can be understood by those skilled in the art that other seals, such as heat seals, adhesive seals, or any other air tight seal may be used.

Inlet section 61 includes a recessed top wall 91 and a downstanding side wall 92 extending around the periphery of the top wall 91. A first downstanding peripheral ridge 93 extends around the periphery of the downstanding sidewall 92 and forms a part of the mechanism which holds the filter element 55 in place, as will be more fully explained hereinafter.

A first protuberance 95 extends from the recessed top wall 91 and carries the inlet 63 and first passage 64 as previously described. A recess 96 provided by the combination of the top surface of the top wall 91, and peripheral side walls 97, almost completely surround the protuberance 95.

A peripheral flange 98 extends from the peripheral side wall 97 and forms a groove 79 extending around the periphery of the inlet section 61 of the filter 60. The groove 79 forms a portion of the construction by which the seal 80 between inlet section 61 and outlet section 62 of the filter 60 is formed.

The shape of the outlet section 62 of the filter 60 is complimentary in shape to the inlet section 61 so that the inlet section 61 may act as a closure to the outlet section 62, or vice versa. It can be easily understood by those skilled in the art that the fluid filter 60 may be of any desired shape, such as the generally circular shape described, an oval shape, a diamond or any other desired shape. A filter media of any desired shape may be placed in a housing of any desired shape and still be well within the scope of the present invention.

Similar to the inlet section 61, the outlet section 62 of the filter 60 has a bottom wall 110 and an upstanding side wall 111. The top of the upstanding side wall 111 fits into the groove 79 in the inlet portion 61, and is preferably sonically welded to form the seal 80. A second protuberance 114 is provided on the exterior portion of the bottom wall 110 and carries the outlet 72.

A second downstanding peripheral ridge 115 complimentary in shape to first downstanding peripheral ridge 93 is provided. First downstanding peripheral ridge 93 and/or second downstanding peripheral ridge 115 may be treated to increase or decrease their surface tension, if desired. It should be understood that the terms "upstanding peripheral ridge" and "down standing peripheral ridge" are used in the sense of describing a pair of substantially opposed peripheral ridges which provide for a pinch seal of a filter media. Other terms may be used to describe these ridges, such as "first" and "second", or "left laterally extending" and "right laterally extending", without departing from the scope and spirit of the present invention.

If desired, a plurality of ribs (not shown because they are well known in the art) is provided on the interior surface(s) of the bottom wall 110, and/or top wall 96, to help support the filter media 55, and provide flow in the second or outlet chamber 68 of the filter 60. In placing such ribs, one needs to be concerned with the volume occupied by the ribs.

The volume of the ribs [also] controls the amount of holdup volume of the filter. Typically, for many reasons, there are more ribs on the downstream side of the filter. The main reasons include the fact that the upstream chamber may be typically drained, therefore, the hold up volume on the downstream side becomes important. In addition, the downstream side is typically cleaner, and particulate contamination and blockage of the ribs are not as important. Also, the higher rib count downstream of the filter provides a better support. As fluid flows from the upstream side through the media, the fluid exerts a force on the media. The media, if not well supported, may collapse within the ribs. This could adversely affect the filtration/separation process, including important parameters such as process time, efficiency, and capacity.

When the outlet portion 62 and the inlet portion 61 are in mating relationships, the first down standing ridge 93 and the second downstanding ridge 115 may be in a 180° opposed relationship. These ridges will provide the "pinch seals" indicated by the numeral 120. Since the media which has been treated extends radially inwardly of the pinch seal 120, a continuous vented area is provided in the filter chamber.

Returning now to the diagrammatic view of the filter shown in FIG. 8, the outlet section 62 of filter housing 60 has a second or outlet chamber 68 which communicates with outlet 72 including port 72A through second passageway 69. The filter element 55 separates the first or inlet chamber 65 from the second or outlet chamber 68.

The flat porous media or filter element 55 may consist of one or more layers, and be made of a wide variety of filter materials. Filter element 55 is held in place in housing 60 between first annular ridge 66 provided about the perimeter of the first or inlet chamber 65 formed in the inlet section 61 of the filter housing 60, and the second annular ridge 70 formed in the outlet section 62. Annular ridge 66 is provided to contact the media 55, and the second annular ridge 70 is chosen to be in a pre-determined desired position opposite the first annular ridge 66, and pinch media 55 therebetween.

The first annular ridge 66 and the second annular ridge 70 are preferably positioned so that they contact the treated or annular or ring portion 56 of the filter media 55, which did not become wetted out, while the interior portion 54 did become wetted out. Any gas entering the filter housing through any means may pass through the non-wetted portion of the filter media, extending inwardly beyond ridges 66 and 70, into the downstream chamber 68, allowing fluid to drain from the downstream lines (not shown), resulting in increased fluid recovery. It is desirable that at least the portion of the filter housing adjacent the perimeter or edge 57 of the media 55 be transparent or translucent, so that any fluid bypass past the first annular ridge and the second annular ridge, 66 and 70 respectively, can easily be observed.

In the embodiment illustrated, the filter element 55 has a liquiphilic (liquid wetting) center 54, and a liquiphobic (liquid repellant) perimeter or edge 57 as previously described. In use, a biological fluid container (not shown), such as a blood container, is placed in fluid communication with inlet port 63A. Similarly a biological fluid receiving bag (not shown) is placed in fluid communication by means well known in the art with outlet port 72A. Fluid flow is initiated, and biological fluid flows in the inlet port 63A through the first passage 64, and through first port 64A into inlet chamber 65. In operation, as the biological fluid enters the inlet chamber 65, the fluid may wick into the filter element 55. The rate at which the biological fluid wicks into the filter element 55 will depend on the properties of the filter media being chosen, and the biological fluid being filtered. These properties include the pore size of the medium, the viscosity of the biological fluid, the surface tension of the biological fluid and the contact angle of the solid-liquid-gas interface. While the fluid level is rising in the inlet chamber 65, any air entrapped in the inlet chamber 65 is passing through a portion of the filter media 55 which has not yet wetted. The treated perimeter or edge 57 (liquid repellent) assures this possibility.

As the fluid level continues to rise in inlet chamber 65, at some point the biological filter element 55 will be sufficiently "wetted", and the biological fluid being filtered will "breakthrough" the filter element 55, and start flowing into the outlet chamber 68. The fluid "breakthrough" depends on the pore size of the material, the surface tension and the contact angle, as well as the pressure differential across the filter element 55.

The biological fluid, which has now started flowing though the filter element 55, will first fill up outlet chamber 68, and when outlet chamber 68 is sufficiently full, the biological fluid being filtered will enter second passageway 69 and pass into the biological fluid receiving container (not shown) through outlet 72.

Due to the pressure differential across the filter element 55, the biological fluid continues to flow up into second passage 69. Eventually all of the biological fluid will be drained from the biological fluid container and will have flowed through passage 64, in the presence of excess gas intended to maximize fluid recovery. It is at this point that one of the advantages of the liquid repellent portion being added to the filter media 55 clearly shows.

In a prior art construction, while all of the fluid flows through the filter media 55 into the downstream or outlet chamber 68, the downstream chamber 68 and the downstream line (not shown) would remain full in typical low pressure applications, such as gravity feed systems, because the media remains saturated with fluid, due to inadequate pressure differential across the filter media to allow air to breakthrough the media. Thus, residual fluid will remain in the filter media, downstream chamber, and downstream lines resulting in a substantial hold-up volume.

The present invention, in addition to providing an enhanced sealing mechanism, provides a novel means to increase fluid recovery, and provides a means to vent gas from the upstream chamber. This is accomplished through providing a differential wettability of the filter media at or about the sealing interface between the filter media and its' sealing means. The liquid repellant section, which provided a means to expel gas from the upstream chamber 65 to the downstream chamber 68 at the onset of filter priming, will at the end of the filtration process, as gas enters the upstream chamber 65, provides a means for gas to travel across the media through the liquid repellant portion to the downstream chamber to recover fluid in the downstream line. The integral gas vent and enhanced sealing means provides fast priming of the filter, as the filter media may be liquid wetting. This integral sealing and vent prevents gas entrapment in the upstream chamber as the liquid repellant portion provides a barrier to fluid and therefore providing a venting means as the upstream chamber is being filled. This is very important since, in typical filter applications, as the fluid enters the filter and is in contact with a filter media that is easily wetted by the fluid, due to capillary forces, the fluid typically wicks in advance of the upstream chamber fluid gas interface. Therefore, if there is no venting means, this will result in gas entrapment in the upstream chamber. Therefore, in the prior art, most media are chosen such that the filter media is not easily wetted by the fluid such that air is not trapped in the upstream chamber but at the same time not to be liquid repellant to such an extent that no fluid passes through the filter media. Therefore, the present invention provides many benefits that enhances the overall performance of the filter media. These include but are not limited to, the venting capability that prevents gas entrapment in the upstream chamber, provides increased fluid recovery, and provides fast priming of the filter. Also it prevents reduced filter media performance if a bubble of air is inadvertently introduced into the filter. In addition, the present invention provides the filter designer with a wide latitude in choosing the material for the filter media based on the critical wetting surface tension (CWST) of the filter media when used in comparison to the ST of the fluid to be filtered as shown by the following examples.

EXAMPLE 1

In a design where the liquid repellent region extends beyond the pinch seal, such as shown for example in FIG. 8, a filter designer can choose the CWST of the filter media in a very broad range. In the case where the designer selects the CWST of the filter media to be much greater than the ST of the fluid being filtered, the filter media will be very hydrophilic (liquid wetting). The present example includes cases in which the liquid repellent region extends to cover the entire pinch seal, goes beyond the pinch seal towards the filter media edge, or fully extends to the edge of the filter media.

Using the housing of FIG. 8, for example, as a fluid, preferably a biological fluid, enters the housing through the inlet section 61, it will begin to fill the upstream chamber 65. As fluid fills the upstream chamber 65, gas exits the housing through the portions of the filter media 55 that has not been wetted by the fluid, i.e., the annular portion 56. Since the filter media 55 has been chosen to be very hydrophilic, the filter 55 is fast priming, while at the same time gas freely passes through the annular portion 56, and vents out of the gas chamber continuously. Since the media and fluid properties are such that no gas entrapment occurs, there is no need for a separate venting means.

The fluid will then continue to flow through the filter media 55 until the fluid entering the upstream chamber 65 is exhausted. Because of the vent provided by the treated annular portion 56 that is not wetted by the fluid, and which extends inwardly beyond ridge 70, as gas enters the upstream chamber it will pass through non-wetted portion 56 and, therefore, in most cases fluid holdback will occur in the upstream and downstream chambers (65,68), while the inlet 64 and outlet 69 will be clear of fluid.

EXAMPLE 2

In a design where the liquid repellent region does not extend beyond the pinch seal, such as shown, for example, in FIG. 12, the filter designer's choices for the CWST of the filter media is limited in comparison to Example 1.

Since the non-wetting region does not extend inwardly beyond the pinch seal, it is preferable for the filter media to have a CWST such that there is no air entrapment in the upstream chamber as fluid first enters the upstream chamber. [This limits the selection of the filter media as compared to example 1.] Under optimal conditions for each example, filter media in example 1 will wet the surface faster than Example 2 under similar conditions. The liquid repellant region, which provides an improved seal, is not wetted by the fluid throughout the filtration process.

As noted previously, in this example, the liquid repellent portion 56 of the filter medium 55 does not extend past the pinch seal. Therefore there is no gas venting means after gas enters the filter housing at the end of the filtration process. After the filtration process, fluid remains in the downstream chamber and downstream lines. The fluid retained in the downstream lines may be used for post evaluation purposes. For example, in the blood banking industry typically the downstream line is segmented, and the segments are used for various purposes, including quality assurance.

In this example, fluid enters the upstream chamber 65 and fills the upstream chamber. No air entrapment will occur in the upstream chamber 65 as the filter media 55 is slow priming (not immediately wetted by the fluid). Once the fluid wets the filter media 55, and fills the downstream chamber 68, fluid will enter the downstream line (not shown). At the end of the filtration process it is typically desired to filter substantially all of the fluid. Gas typically follows the fluid at the end of the filtration process. When the differential pressure across the filter media 55 is lower than the pressure required to push air through the wetted filter media air does not pass through the filter media. Fluid drains from the upstream chamber 65 under differential pressure and substantially all the fluid is filtered. Gas is trapped in the upstream chamber and the downstream chamber, outlet 69, and the downstream lines are filled with fluid. The fluid in the downstream chamber 68 and line (not shown) may be used for post filtration samples. It is to be noted that Example 2 is most likely slower priming than Example 1.

EXAMPLE 3

In this example the designer has again chosen a media wherein the CWST of the media is greater or equal to the ST of the fluid being filtered such that no significant air entrapment would occur in absence of differential surface tension property proximal to the sealing means. In this example, An annular portion 56, which includes a dome shaped, or other shaped, vent such as 76 shown in FIG. 13, has been treated to be more liquid repellent than the filter media 55. Vent portion 76 acts as a vent after substantially all of the fluid is filtered and gas substantially fills the upstream chamber 65. The liquid repellent region, which is not wetted by the fluid, allows gas passage from the upstream chamber 65 into the downstream chamber 68 after substantially all the fluid is filtered. In order to recover as much of the fluid as possible, the fluid repellent region 56 extends further inwardly at the bottom of the filter to form a gas vent 76. The gas passage through this inwardly extending section allows the downstream lines to be drained. By providing a narrower gap and providing ribs in the downstream chamber it is possible to drain the downstream chamber completely.

EXAMPLE 4

Figure 22:
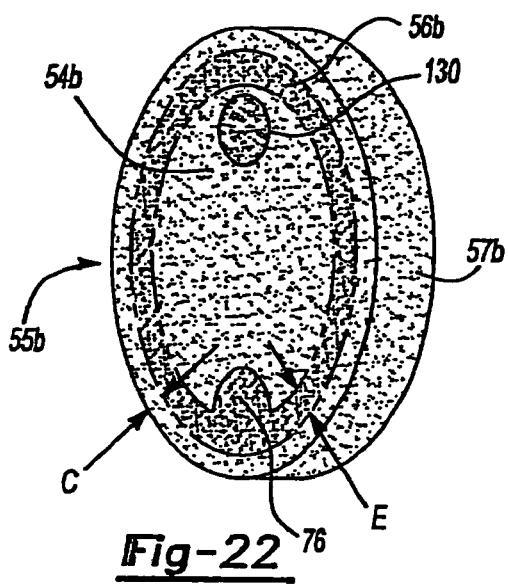
FIG. 22 is a perspective view, similar in part to FIG. 13, but showing the addition of a top or upper vent.

Example 4 envisions the same choice by the designer as Example 3, with an additional liquid repellent region or top or upper vent 130 at the top portion of the media, such as shown in FIG. 22. The media shown in FIG. 22 may be identical to the media shown in FIG. 13, except for the addition of the additional liquid repellent region or upper vent 130. The upper vent 130 may be extending inwardly of the pinch seal to allow air to vent from the upstream chamber into the downstream chamber at the onset of the filtration process. This extra liquid repellent section or upper vent 130 is treated such that is not immediately wetted by the fluid. However, it is wetted during the filtration process. This additional liquid repellent section 130 will provide faster priming of the filter housing. It will also provide a means for preventing gas entrapment in the upstream chamber 65 as the upstream chamber is filled at the start of the process. In addition, it will prevent gas passage through the section at the end of the process such that all fluid in the upstream chamber 65 may empty from the upstream chamber. Further preferred embodiments of the present invention using these design considerations are discussed below.

Referring now to FIGS. 9-12, there is shown a modification of the invention described in FIGS. 8-11 where the liquid repellant region does not extend inwardly past the sealing means. In this embodiment, an integral gas vent is not present. A benefit of the present invention, as described previously, is the enhanced sealing mechanism. In this embodiment, in absence of a venting means, the filter media is typically chosen such that there is no significant gas entrapment present in the upstream chamber at the onset of filtration. Due to a lack of a venting means, at the end of the filtration process, as gas enters the upstream chamber, gas typically can not pass through the filter, due to fact that the pressure differential required to pass gas through the wetted filter media exceeds that present as gas enters the upstream chamber. Therefore, gas fills the upstream chamber and substantially all fluid is filtered.

For ease in illustrating the various surface treatment modifications of the filter construction, the diagrammatic view of FIGS. 8, 12 and 16, rather than the more detailed filter housing construction views shown in FIG. 19-21, will be used in the remainder of the application.

Referring to FIG. 9 there is shown a first modified porous flat media 55A having a first modified or annular treated ring portion 56A spaced a distance "C" from the edge 57A of first modified filter element or porous media 55A. Used in conjunction with modified filter media 55A is first modified filter housing 60A, shown in FIG. 12. The construction of filter housing 60 and first modified filter housing 60A is substantially identical except for the placement and dimensions of the second upstanding ridge 115A formed on the outlet section 62A and the first upstanding ridge 93A formed on the inlet section 61.

While first upstanding ridge 93A and second upstanding ridge 115A are still in an opposed relationship, their width has been increased to dimension D, which is wider than the width E of the first modified annular or ring portion 56A, and may begin at the outer periphery of the first modified annular or ring portion 56A and extend beyond the inner diameter of the modified annular or ring portion 56A. Accordingly, dimension "D" may be greater than dimension "E", and the first modified annular or ring portion 56A may be co-extensive with the outer diameter of the annular upstanding ridges (93A, 115A).

Referring to FIG. 11, it can be seen that in some instances the treated annular portion 56A may not extend through the entire depth of the filter media 55A but may instead have surface treated portions 56A on both sides of the porous media 55A. While this version may be useful in some applications, it is not the most preferred embodiment, because the fluid being filtered may wick to the edge 57A, or beyond, resulting in possible fluid loss.

Modifications which prevent this are shown in FIGS. 11A-11C. In FIG. 11A the first modified filter media 55A has the first modified annular or ring shaped treated portion 56A in the form of an inwardly radially extending U-shaped channel 56F. In FIG. 11B, it is shown as an outwardly radially extending U-shaped channel 56G. In FIG. 11C the first modified annular or ring shaped treated portion 56A is in the form of a box channel 56H.

A still further modification of the invention may be seen by referring to FIGS. 13-16. FIGS. 13 and 14 show a second modified filter media 55B mounted in a second modified filter housing 60B (FIG. 16), which may be similar to the first modified filter housing 60A shown in FIG. 12. In this instance, the dimensions C, D, and E may be equal and uniform around the second modified media 55B, and may be identical to those of the first modified filter media 55A except where the filter vent 76 is provided. The filter vent 76 is shown as a semi-circular shape, but may be of any desired shape, and instead of being a width of dimension D spaced a distance C from the edge, the filter vent is of a dimension F which begins at the inner periphery of the second modified annular or ring portion 56B and extends for a distance F, which brings a portion of the filter vent 76 above the first and second downstanding peripheral ridges 93B and 115B respectively, which are pinch sealing the second modified filter element 55B in modified filter housing 60B.

In this modification of the invention, there is an extra passageway for air which extends above the ridges 93B, 115B pinching the second modified filter media 55B. As the fluid being processed passes through the inlet chamber 65B and through second modified media 55B, any air entrapped in the inlet chamber 65B will rise to the top of the inlet chamber 65B. As the fluid continues to be filtered, the fluid level will drop down to the bottom of the inlet chamber 65B, and any trapped air can now pass through the filter vent 76, and up to the top of the inlet chamber 65B. If a plurality of parallel ribs (not shown) are carefully placed downstream in the outlet chamber 68B this air will carry any fluid remaining in the outlet chamber up and out through the outlet 72. Thus, in this modification of the invention, not only the inlet chamber 65B, but the outlet chamber 68B, and the downstream line (not shown) will be empty, thus reducing hold back volume to a minimum.

Referring now to FIG. 15, a modification of the second modified filter element 55B is shown where the second modified annular or ring portion 56B does not extend for the entire depth of the second modified filter media 55B.

In FIG. 15, there is shown filter vent 76 having a front surface portion 77, a rear surface portion 78, and a leg 83 connecting the front surface portion 77 and rear surface portion 78 proximate the middle thereof. The leg 83 is needed for the air to pass between the front surface portion 77 and rear surface portion 78, and may be placed in any desired position between the two. Even if placed below the fluid level in the filter, the suction pressure is believed to be sufficient to cause the air remaining upstream after the filtering operation to pass through. While this is not a preferred embodiment because the fluid being filtered may wick to, and possibly past, the edge 57B, it may be useful for some applications.

Modifications which prevent this are shown in FIGS. 15A-15B. In FIG. 15A the second modified filter media 55B has the second modified annular or ring shaped treated portion 56B in the form of an inwardly radially extending U-shaped channel 56J. In FIG. 15B, it is shown as an outwardly radially extending U-shaped channel 56K.

In FIG. 15A the leg 83 is shown connecting front surface portion 77 of the filter vent 76 and the rear surface portion 78 thereof at their outer extremities in the form of a radially inwardly extending channel. In FIG. 15B the leg 83 is placed at the innermost possible position to connect front surface portion 77 and rear surface portion 78 of filter vent 76. As explained hereinabove the leg 83 can be at the position shown in FIG. 15A, the position shown in FIG. 15B, or any place in between and still perform satisfactorily.

With the foregoing explanation, additional benefits of the present construction may be seen. When the flat porous media has the annular or ring portion 56 treated or present for the entire depth of the flat porous media as shown in FIG. 10, any fluid passing past the downstanding peripheral ridges (93, 115) is an indication of fluid bypass or filter failure, since a higher pressure is needed to bypass the pinch seals than if the treated annular or ring portion 56 were absent. Thus, if the filter housing (60,60A,60B) were transparent or translucent, at least around the periphery thereof, any fluid which might flow past the annular or ring portion (56,56A,56B) could be easily observed by the user of the filter housing (60,60A,60B) and the filter process could be stopped, and the fluid being filtered could be saved.

Referring now to FIGS. 18A-18H, it can be seen that the surface treatment modification of the present invention is not just useful with flat filter media or discs, but can also improve the sealing capabilities of tubular filters as well. In FIG. 18A there is a perspective view of tubular filter 120 having an upper edge region 121A proximate the upper end 121 of filter 120, and lower edge region 122A proximate the lower end 122 of the filter 120 treated with the surface treatment modification of the present invention. The treated regions (121A, 122A) will preferably be of annular shape and may extend for the entire thickness of the filter tube, but may be of other shapes and cross sections if desired. For example, annular shaped treated regions may extend for a finite depth on the inside or outside of the tubular filter 120.

By making the ends of the tubular filter 120 more liquid repellent, it is harder for liquid to bypass the ends of the filter tube when the filter tube is held between a pair of end caps, as is typical in prior art filter housings. Thus, a tubular filter 120 having its ends 121, 122, respectively treated with a liquid repellent is well within the scope of the present invention.

Referring now to FIG. 18B, there is shown a modification of the construction shown in FIG. 18A wherein the filter tube 120 has annular portions thereof (121A, 122B) treated with a surface treatment modification to be more liquid repellent than the remainder of the filter tube 120. However, instead of being proximate the ends of the filter tube (121, 122), they are spaced a short, predetermined distance X therefrom. This will provide a mechanism for sealing the filter tube 120 on its' outer and/or inner surface (120A, 120B) instead of, or in addition to, its' ends (121, 122).

Referring now to FIG. 18C, there is shown a filter construction capable of accomplishing this. The filter construction shown in FIG. 18C may be identical to the filter construction shown in FIG. 4, except that the end cap, now identified by the numeral 49A for the purpose of clarity, has been provided with a first or outer upstanding peripheral wall 49B, and a second or inner upstanding peripheral wall 49C spaced inwardly a predetermined distance from first or outer upstanding peripheral wall 49B to create a pair of spaced walls between which the lower end of the filter tube 120A can be sealed.

The spacing between the walls 49A, 49B should be such as to put sufficient pressure on the treated annular portion 122A to avoid fluid bypass.

The other end of the filter tube 120A may be sealed in a similar manner by providing a modified upper end cap (not shown), or it may be sealed in a conventional manner.

Instead of a single treated region (121a, 122A) being provided proximate upper and/or the lower ends (121, 122) of the tubular filter 120 being provided (as shown in FIG. 18A), a pair of treated annular regions (122C, 122D) extending for a finite depth, less than the thickness of the tubular filter 120, may be provided proximate the upper and/or lower end of the tubular filter 120. This is shown on an enlarged scale in FIG. 18D.

Referring now to FIGS. 18E-18H, There are shown several modifications of the end cap 49A illustrated in FIGS. 18C and 18D. In FIG. 18E, there is illustrated a further modified end cap, now identified by the numeral 150 for clarity. End cap 150, as can end cap 49A, may have an outer upstanding peripheral wall 150A (FIG. 18G), an inner upstanding peripheral wall 150B (FIG. 18H), or both FIGS. 18E, 18F). Also walls 150A and 150B, as can walls 49B, 49C, can be in a concentric or non-concentric orientation with each other, can be of any desired height, and can be placed anywhere on the end cap (150, 49A) depending on the application.

Outer peripheral wall 150A may have a first slanted surface 160 provided on its inner portion 162. The angle which the slanted surface 160 makes with the top surface 164 may vary depending on the application.

Likewise, the inner peripheral upstanding wall 150B may have a second slanted surface 168 provided on its outer portion 170. A flat top surface 175 may be provided as part of the outer peripheral wall 150B and/or the inner peripheral wall 150B if desired.

The slanted portions (160, 168) are designed to push inwardly in on, and slightly crush the surface treated portions (122C, 122D) as pressure is applied to the end cap 150 to seal the tubular filter 120 in a filter housing, as shown in FIG. 18F.

The height of the walls (49B, 49C) (150A, 150B) should be sufficient so that the inner wall (49C, 150B) and/or the outer wall (49B, 150A) contact at least a portion of the treated annular portion 122C and/or 122D.

FIG. 18G shows a modification of the construction shown in FIG. 18E wherein the end cap 150 has only an outer, upstanding, peripheral wall 150A sealing against an outer surface treated portion 122C.

FIG. 18H shows a modification of the construction shown in FIG. 18E wherein the end cap 150 has only an inner, upstanding, peripheral wall 150B sealing against an inner surface treated portion 122C.

Referring to FIG. 22, there is shown a construction embodying the present invention, wherein a top or upper vent 130 is added to permit to allow air to vent from the upstream chamber into the downstream chamber at the onset of the filtration process for the purposes described above. The top or upper vent or upper surface treated area 130 can be treated with the same or different treatment as the vent 76.

Figure 23:
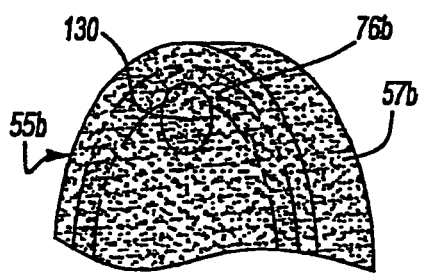
FIG. 23 is a perspective view, similar in part to FIG. 22, but showing the upper vent overlapping the surface treatment modification and being constructed of the same material.

FIG. 23 shows a construction similar to that shown in FIG. 22 wherein the top or upper vent or upper surface treated area 130 overlaps the annular surface treated portion 56B, and is treated with the same surface treatment modification.

Figure 24:
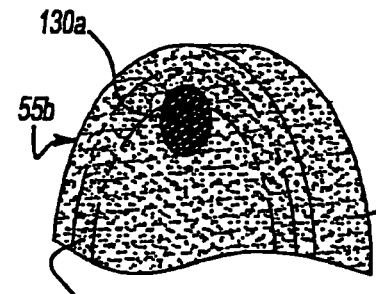
FIG. 24 is a perspective view, similar in part to FIG. 22, but showing the upper vent overlapping the surface treatment modification and being constructed of a different material.

FIG. 24 shows a construction similar to that shown in FIG. 22 wherein the top or upper vent or upper surface treated area 130 overlaps the annular surface treated portion 56B, but is treated with a different surface treatment modification.

It may be desirable for some applications to have a top vent 130 as shown in FIGS. 22-24, without the bottom vent 76, and this is well within the scope of the present invention.

The present invention is not limited to the circular discs or tubular filters previously illustrated but may also be applied, as will be apparent, to other tubular or cylindrical elements that are pleated, formed and/or rolled. The shape of the treatment may vary to suit the applicability of the filter design. For example as shown in FIGS. 5, 9 and 13, concentric treatments are shown, but the present invention should be understood not to be limited as such.

Further, there are various chemical treatments known in the art for producing the surface treatment modifications. The preferred treatments for such applications are fluorinated or silicon zed polymers for liquid repellent applications, and polyvinyl alcohol and cellulose acetate for liquid wetting applications. Other treatments will be apparent to those skilled in the art.

Many preferred embodiments of the present invention have been described herein. The scope of the present invention is broad, and many more embodiments of the invention can be developed using the teachings herein, and these are well within the scope of the present invention. For example, with reference to FIGS. 8, 12, 16 and 21, the dimensions shown are limited to the example in regard to which they discussed. As long as the hydrophobically treated portion of the media being held in a pinch seal extends radially inwardly of the opposed upstanding walls forming the pinch seal, a vented area will be formed. Therefore, for example, in FIGS. 12 and 16, dimension D may be larger or smaller than dimension E, depending on the application, and be well within the scope of the present invention.

Thus, by carefully considering the problems present with filtering fluids, a novel surface treatment has been developed which reduces hold-up volume and produces numerous other advantages when compared with prior art devices.

The invention claimed is:

1. A porous filter media having at least two kinds of through pores extending from one surface to an opposite surface, first pores of the at least two kinds of through pores wetted by a liquid, and second pores of the at least two kinds of through pores being treated only part way through the thickness of the filter media between the opposed surfaces to be liquid repellant.

2. The porous filter media of claim 1 wherein said second pores form a chemically treated liquid repellent porous sealing region only about a periphery of the filter media, and said first pores form a liquid wetting filter area which, when sealed in a filter housing, provides for a minimum fluid loss and substantially no loss of performance parameters by preventing any fluid holdup due to the sealing mechanism of the housing, thermal fluctuations, or delamination.

3. The porous filter media of claim 1 wherein said second pores form a chemically treated liquid repellent porous sealing region only about its a periphery of the filter media, and said first pores form a liquid wetting filter area which results in a leak free media when used in a steam sterilization application, by preventing compromise of the seal due to thermal fluctuations or delamination.

4. The porous filter media of claim 1 being disc-shaped and having two or more layers and having differential wetability of the filter media surface across the radial direction of the filter media.

5. The porous filter media of claim 1 for filtering a fluid having one or more layers, at least one of the one or more layers having two or more distinct use-based CWST regions formed by said first and said second pores, at least one of the two or more distinct use-based CWST regions formed by said second pores having a CWST less than the ST of the fluid to be filtered, thereby allowing the porous filter media to be used to prevent fluid bypass when the porous filter media is used in a filter and the filter is filtering the fluid.

6. The porous filter media of claim 1 having an edge region forming a pinch seal region, the porous filter media being pinch sealed at the pinch seal region between two halves of a filter housing with at least a portion of the filter media extending radially outwardly past the pinch seal region, at least a portion of the filter housing proximate the pinch seal region allowing a visual inspection of the portion of the filter media which extends past the pinch seal region while filtering a liquid.

7. In combination:
a) a filter housing comprising:
i. an inlet section having an inlet, a downstanding peripheral sidewall, and a first peripheral ridge extending around the periphery of the downstanding peripheral sidewall;
ii. an outlet section having an outlet, an upstanding peripheral sidewall, and a second peripheral ridge extending around the periphery of the upstanding peripheral sidewall; and
b) a flat filter media having at least two kinds of through pores extending from one surface to an opposite surface, first pores of the at least two kinds of through pores wetted by a liquid, and second pores of the at least two kinds of through pores being treated only part way through the thickness of the filter media between the opposed surfaces to be liquid repellant, said second pores forming a chemically treated liquid repellent porous sealing region only about its periphery, and said first pores forming a liquid wetting filter area which provide for a minimum fluid loss and substantially no loss of performance parameters by preventing any fluid holdup due to the sealing mechanism of the housing, thermal fluctuations, or delamination,
wherein a portion of the flat filter media including said second pores is pinch sealed between the first peripheral ridge and the second peripheral ridge of the filter housing.

8. The porous filter media defined in claim 1 and having a third type of through pores being treated to be liquid repellant.

9. The porous filter media defined in claim 1, wherein only a portion of the second pores of the at least two kinds of through pores are treated only part-way through the thickness of the filter media between the opposed surfaces to be liquid repellant.

* * * * *